(12) United States Patent
Sobanski

(10) Patent No.: US 12,091,183 B1
(45) Date of Patent: Sep. 17, 2024

(54) POWER TURBINE SHAFT FOR DECOUPLED GAS GENERATOR

(71) Applicant: Raytheon Technologies Corporation, Farmington, CT (US)

(72) Inventor: Jon Erik Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/308,766

(22) Filed: Apr. 28, 2023

(51) Int. Cl.
*B64D 35/02* (2024.01)
*B64D 27/10* (2006.01)

(52) U.S. Cl.
CPC ............. *B64D 35/02* (2013.01); *B64D 27/10* (2013.01)

(58) Field of Classification Search
CPC .... Y10S 138/11; F16C 2326/06; F16C 3/026; F02C 7/36; B64D 35/02; B64D 27/10
See application file for complete search history.

(56) References Cited

U.S. PATENT DOCUMENTS

| | | |
|---|---|---|
| 2,380,952 A | 8/1945 | Dewey |
| 5,287,768 A | 2/1994 | Amborn et al. |
| 5,346,432 A | 9/1994 | Greulich et al. |
| 9,624,964 B2 | 4/2017 | Laskey et al. |
| 11,724,813 B2 * | 8/2023 | Payyoor ............ F02C 7/06 244/54 |
| 2013/0205747 A1 * | 8/2013 | Suciu ............ F02K 3/06 29/889.22 |
| 2016/0115866 A1 * | 4/2016 | Suciu ............ F01D 25/24 60/39.12 |

OTHER PUBLICATIONS

Rauch, Design Study of an Air Pump and Integral Lift Engine ALF-504 using the Lycoming 502 Core, NAS 3-15696, Jul. 1972.*

* cited by examiner

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A propulsion system for an aircraft includes a propulsor section that includes a fan with a plurality of fan blades that are rotatable about a fan axis, a core engine that is configured to generate a gas flow, a power turbine where the gas flow from the core engine is expanded to generate shaft power, and a power turbine shaft that is coupled between the power turbine and the propulsor section. The power turbine shaft is of an axial length between a first end portion and a second end portion along the fan axis that is greater than half a distance between a leading edge of the fan blades and a mechanical coupling of the power turbine shaft to the power turbine, and includes an outer diameter that increases in a direction away from each of the first end portion and the second end portion.

18 Claims, 5 Drawing Sheets

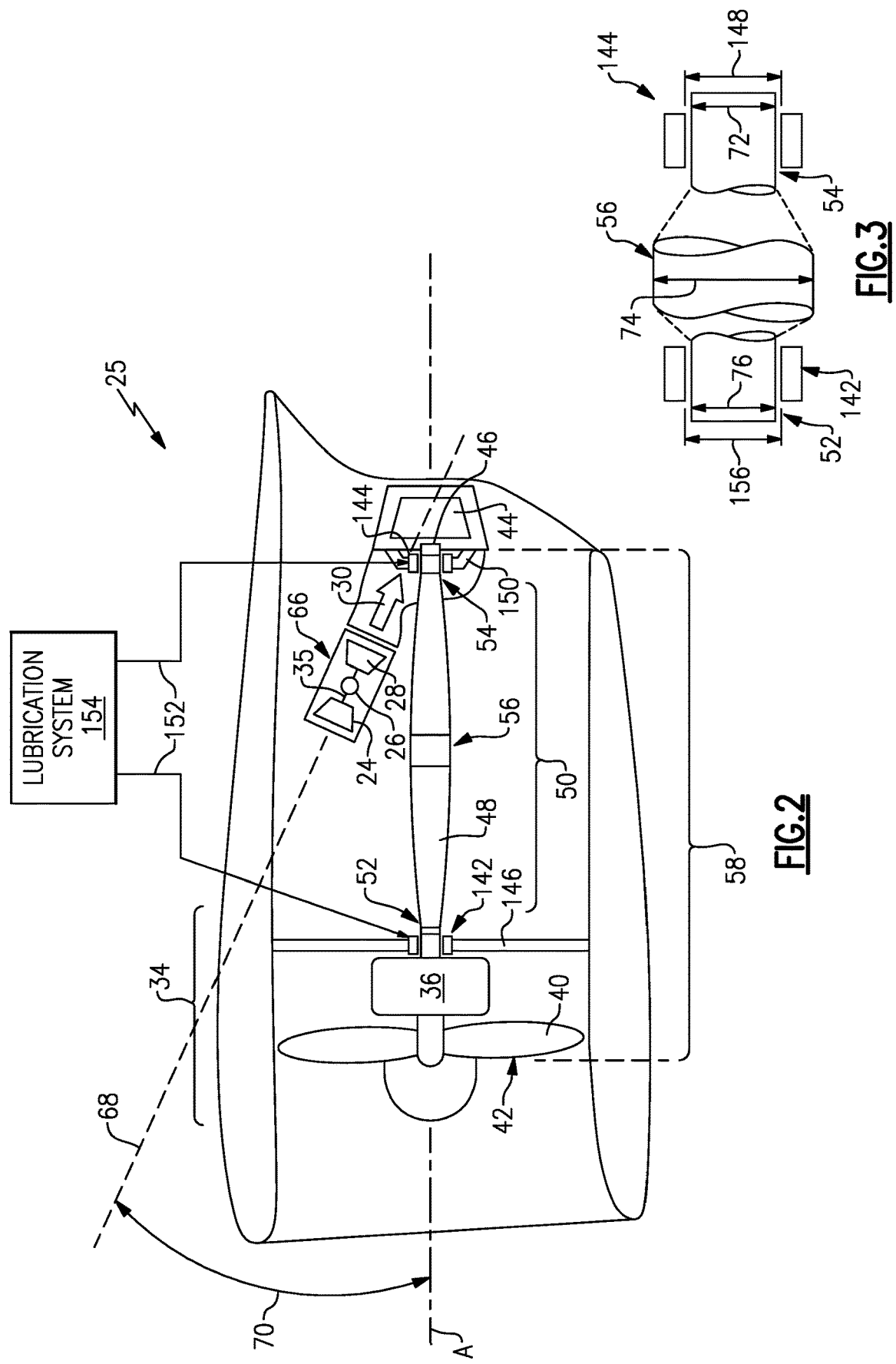

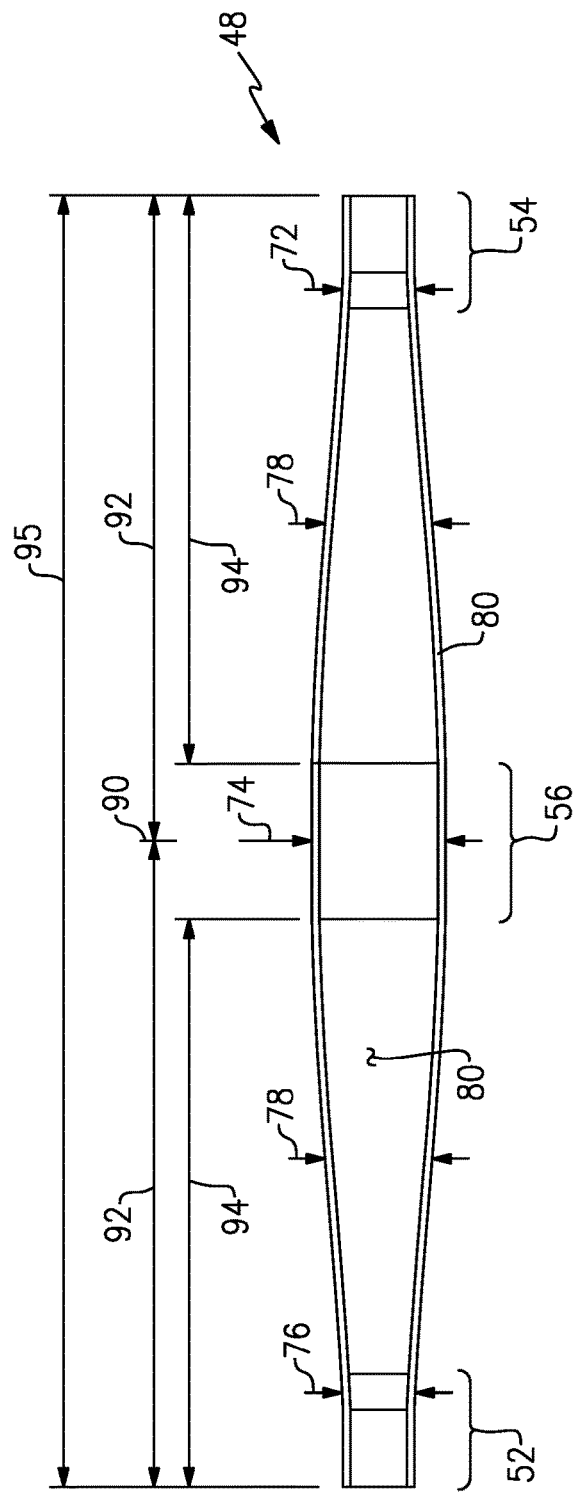
FIG.4
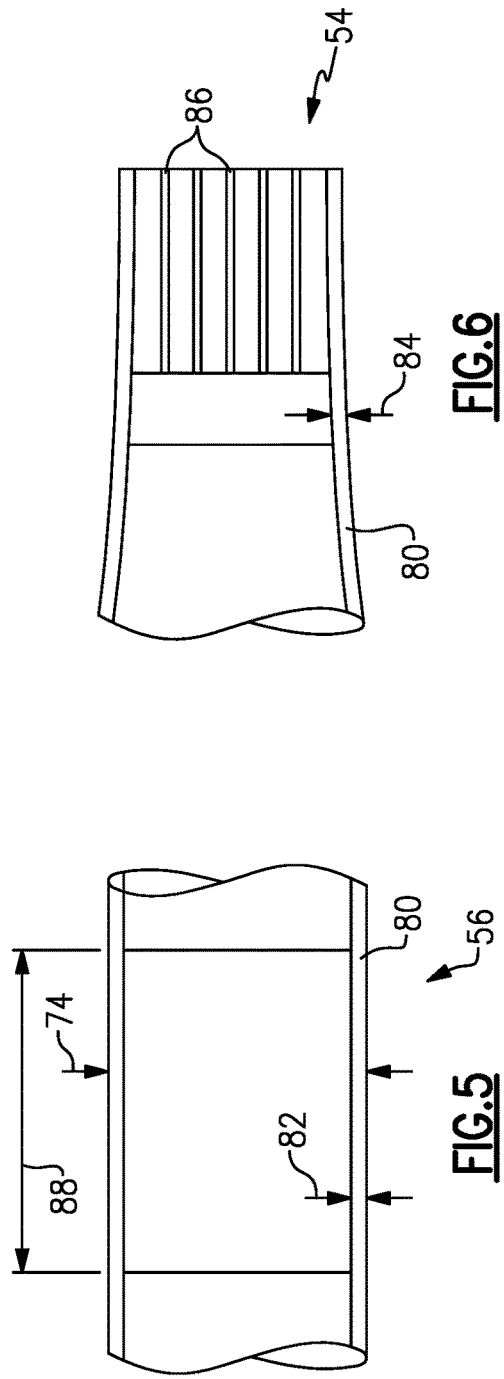
FIG.6
FIG.5

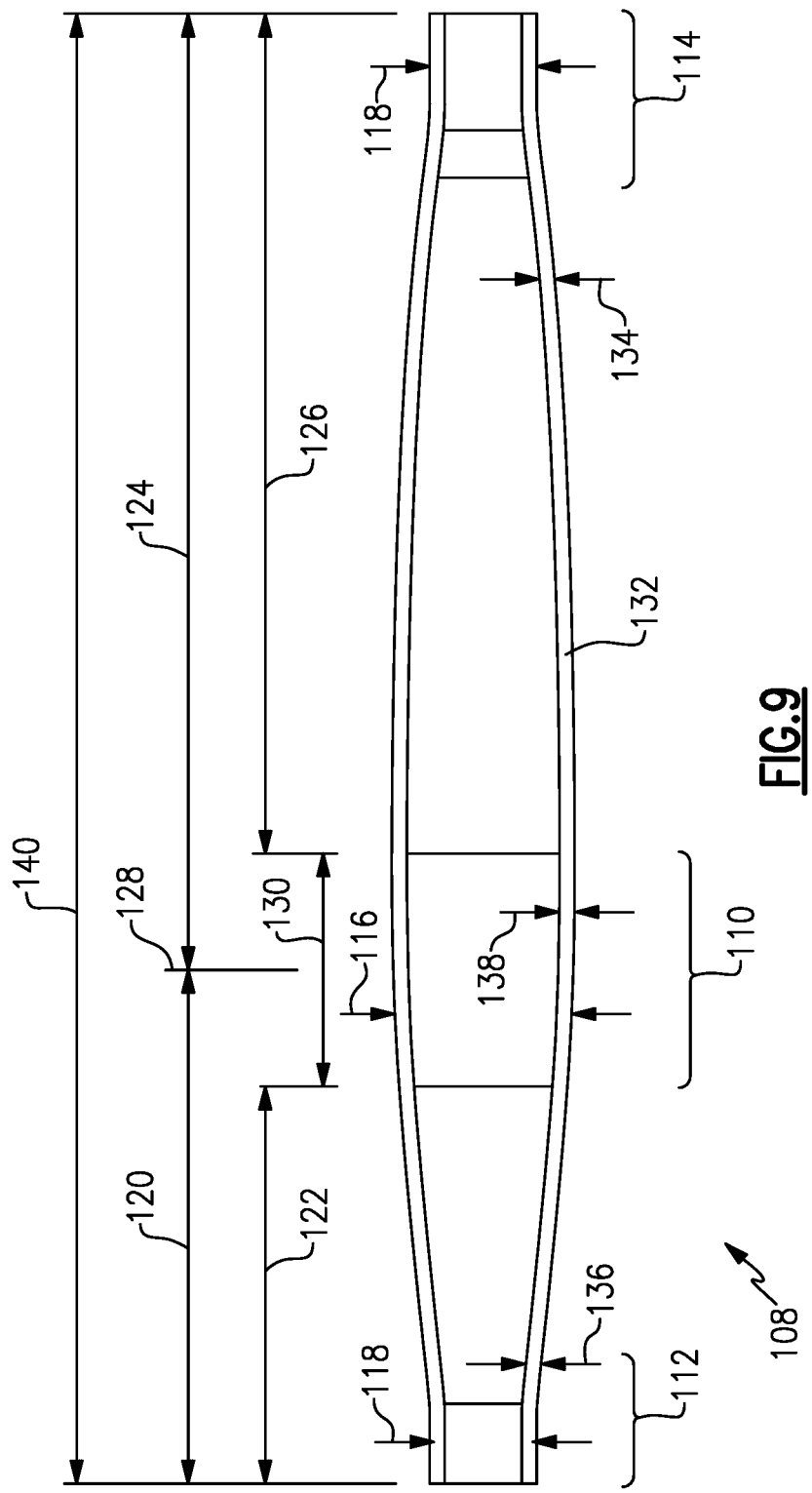

POWER TURBINE SHAFT FOR DECOUPLED GAS GENERATOR

TECHNICAL FIELD

The present disclosure relates generally to turbine engine that includes a decoupled gas generator driving a propulsive fan and more particularly to a power turbine shaft coupling a gas generator to a propulsive fan.

BACKGROUND

Reduction and/or elimination of carbon emissions generated by aircraft operation is a stated goal of aircraft manufacturers and airline operators. Gas turbine engines generally include a gas generating core engine that drives a propulsive fan through a nested shaft. In some engine architectures the shaft driving the fan may be relatively long as compared to the overall engine structure. Rotor dynamic stability of long shafts can be challenging and require additional bearing structures. Additional bearing structures can complicate engine architectures and inhibit implementation of other desirable engine features.

SUMMARY

A propulsion system for an aircraft according to one example disclosed embodiment includes, among other possible things, a propulsor section that includes a fan with a plurality of fan blades that are rotatable about a fan axis, a core engine that is configured to generate a gas flow, a power turbine where the gas flow from the core engine is expanded to generate shaft power, and a power turbine shaft that is coupled between the power turbine and the propulsor section. The power turbine shaft is of an axial length between a first end portion and a second end portion along the fan axis that is greater than half a distance between a leading edge of the fan blades and a mechanical coupling of the power turbine shaft to the power turbine, and includes an outer diameter that increases in a direction away from each of the first end portion and the second end portion.

In a further embodiment of the foregoing propulsion system, the core engine is centered on a core axis that is inclined relative to the fan axis.

In a further embodiment of any of the foregoing propulsion systems, the propulsor section is forward of the power turbine and the core engine is disposed aft of the power turbine.

In a further embodiment of any of the foregoing propulsion systems, the power turbine shaft is unsupported between the first end portion and the second end portion.

In a further embodiment of any of the foregoing propulsion systems, the propulsor section includes a fan drive gear system that is coupled to the power turbine shaft.

In a further embodiment of any of the foregoing propulsion systems, a cross-sectional area transverse to a longitudinal length of the power turbine shaft is uniform between the first end portion and the second end portion.

In a further embodiment of any of the foregoing propulsion systems, a ratio of a maximum radial wall thickness and a minimum radial wall thickness of the power turbine shaft is between 1.1 and 3.0.

In a further embodiment of any of the foregoing propulsion systems, a center portion of the power turbine shaft is disposed between the first end portion and the second end portion includes a maximum outer diameter and a minimum wall thickness.

In a further embodiment of any of the foregoing propulsion systems, a ratio of an outer diameter at the center portion to an inner diameter of a bearing assembly at either of the first end portion and the second end portion is between 1.25 and 5.00.

In a further embodiment of any of the foregoing propulsion systems, the center portion is disposed an equal distance from each of the first end portion and the second end portion.

In a further embodiment of any of the foregoing propulsion systems, the center portion is disposed at a location between 50% and 75% of a total length of the power turbine shaft.

In a further embodiment of any of the foregoing propulsion systems, the center portion includes a constant outer diameter over a center axial distance.

In a further embodiment of any of the foregoing, the propulsion system further includes a nacelle that surrounds the core engine and the fan section. The nacelle defines a bypass flow path through the nacelle and around the power turbine and the core engine.

A propulsion system for an aircraft according to another example disclosed embodiment includes, among other possible things, a fan section that includes a fan drive gear system that drives a fan shaft supporting a plurality of fan blades about a fan axis, a core engine that defines a core flow path where air is compressed in a compressor section, communicated to a combustor section, mixed with fuel, and ignited to generate a gas flow that is expanded through a turbine section, a power turbine where the gas flow from the core engine is expanded to generate shaft power, and a power turbine shaft for transmitting torque from the power turbine to the fan drive gear system, the power turbine shaft is hollow and includes an outer diameter that increases in a direction away from each of a first end portion and a second end portion and is of an axial length between the first end portion and the second end portion along the fan axis that is greater than half a distance between a leading edge of the plurality of fan blades and a mechanical coupling to the power turbine.

In a further embodiment of the foregoing propulsion system, the power turbine shaft is unsupported between the first end portion and the second end portion.

In a further embodiment of any of the foregoing propulsion systems, a cross-sectional area transverse to a longitudinal length of the power turbine shaft is uniform between the first end portion and the second end portion.

In a further embodiment of any of the foregoing propulsion systems, a center portion of the power turbine shaft is disposed between the first end portion and the second end portion includes a maximum outer diameter and a minimum wall thickness.

In a further embodiment of any of the foregoing propulsion systems, the core engine includes at least one shaft that couples the turbine section to the compressor section and the maximum diameter of the power turbine shaft is greater than any outer diameter of the at least one shaft of the core engine.

A method of operating a gas turbine engine, the method according to another example disclosed embodiment includes, among other possible things, generating a gas flow with a core engine that is disposed about a core engine axis that is inclined relative to a fan axis, generating shaft power to drive the fan having a plurality of fan blades with a power turbine that receives the gas flow from the core engine, and transmitting shaft power to a fan that is disposed about the fan axis through a power turbine shaft with an axial length along the fan axis that is greater than half a distance between a leading edge of the plurality of fan blades and a mechanical coupling to the power turbine.

In a further embodiment of the foregoing method, the power turbine shaft includes an outer diameter that increases in a direction away from each of a first end portion and a second end portion and has a 1st mode natural frequency that is at least 15% greater than a similar shaft with a uniform outer diameter.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic cross-section of another example aircraft propulsion system.

FIG. 3 is a schematic view of portions of an example power turbine shaft embodiment.

FIG. 4 is a cross-section of an example power turbine shaft embodiment.

FIG. 5 is a cross-section of a center portion of the example power turbine shaft embodiment.

FIG. 6 is a cross-section of an end portion of the example power turbine shaft embodiment.

FIG. 9 is a cross-section of another example power turbine shaft embodiment.

DETAILED DESCRIPTION

Figure 1:
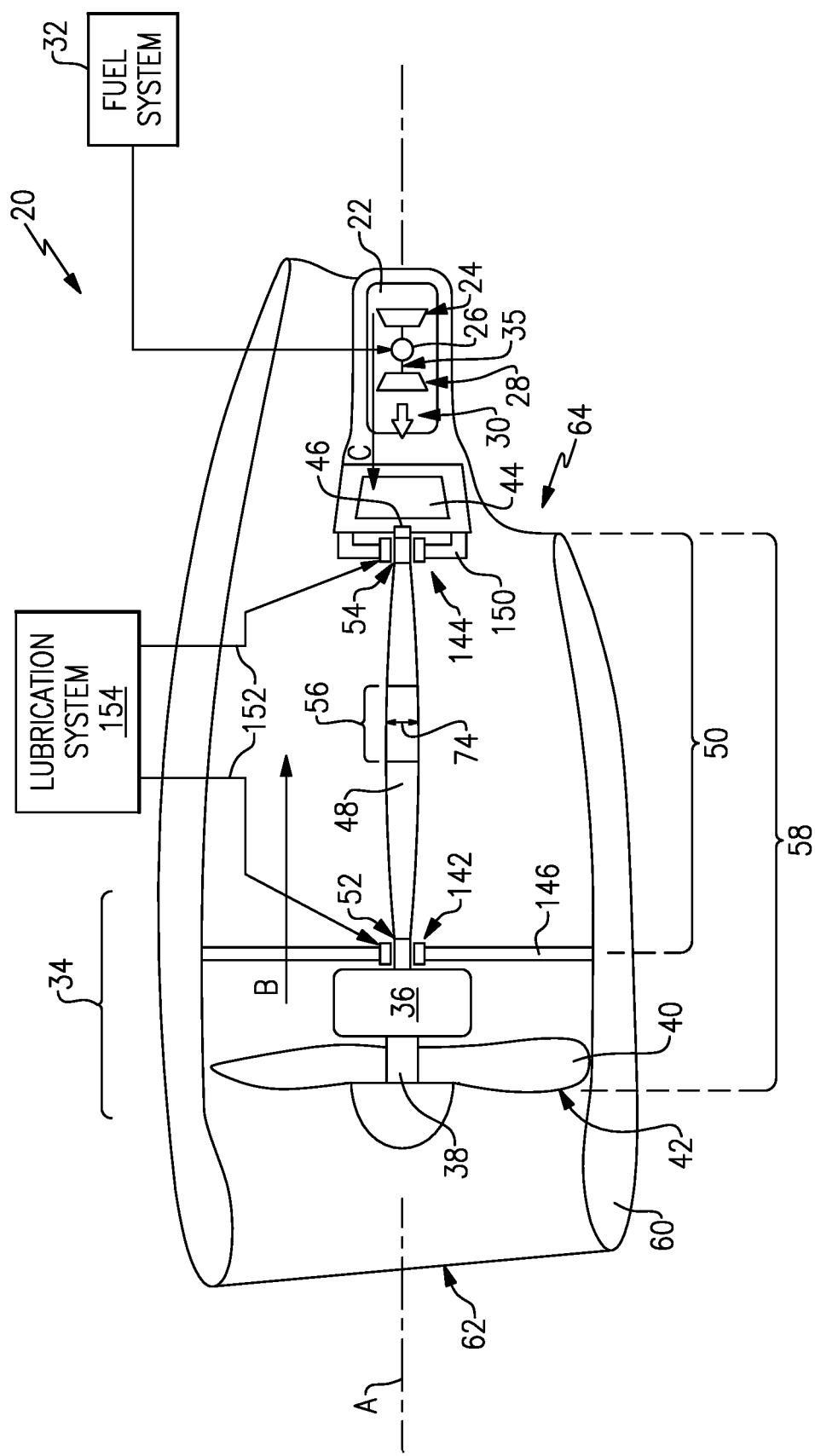
FIG. 1 is a cross-sectional view of an example aircraft propulsion system.

FIG. 1 schematically illustrates an example propulsion system 20 with a gas generating core engine 22 spaced apart from a propulsive fan section 34. Decoupling from the fan section 34 provides for alternate locations of the core engine 22 and space within the nacelle 60 for additional components useful in alternate engine architectures. In one example embodiment shown in FIG. 1, the core engine 22 is located aft of a power turbine 44. Shaft power generated by the power turbine is transmitted through a power turbine shaft 48 to drive a fan drive gear system 36.

The spaced apart location of the core engine 22 results in a long power turbine shaft 48. Long, unsupported shafts may present rotor dynamic challenges that are not present in conventional engine architectures where the core engine 22 is mechanically coupled directly to the fan section 34. The example power turbine shaft 48 includes features that provide rotor dynamic stability without a centrally located bearing support structure.

The core engine 22 defines a core flow path C through a compressor section 24 that communicates a pressurized airflow to a combustor section 26 where it is mixed with fuel from a fuel system 32 and ignited to generate an exhaust gas flow 30. The exhaust gas flow 30 expands through a turbine section 28 that is coupled through at least one shaft 35 to the compressor section 24. The exhaust gas flow 30 is then exhausted to the power turbine 44. The power turbine 44 is not mechanically coupled to core engine 22 and therefore rotates independent of the compressor section 24 and turbine section 28 of the core engine 22.

The fuel system 32 is shown schematically and may provide a flow of a liquid hydrogen ($LH_2$) fuel to the core engine 22. Although liquid hydrogen is described by way of example, other non-carbon based fuels, biofuels and sustainable aviation fuels could also be utilized and are within the scope and contemplation of this disclosure. Additionally, traditional carbon-based fuels could also be utilized and are within the contemplation and scope of this disclosure.

The core engine 22 and the fan section 34 are disposed within a nacelle 60 that defines a bypass flow path B between an inlet 62 and exhaust outlet 64. The core engine 22 is at or past the exhaust outlet 64. The fan section 34 is disposed near the inlet 62. The example fan section 34 includes a plurality of fan blades 40 supported on a fan shaft 38 driven by the fan drive gear system 36. The fan drive gear system 36 is driven by the power turbine 44 through the power turbine shaft 48. The fan drive gear system 36 may be an epicycle gear train, such as a planetary gear system or other gear system, with a gear reduction ratio between about 2.5:1 and 5:1. It should be understood, however, that the above parameters are only exemplary of one embodiment of a fan drive gear system 36 and other gear system configurations may be utilized within the contemplation and scope of this disclosure.

The power turbine shaft 48 is disposed along the fan axis A and includes a first end portion 52 coupled to the gear system 36 and a second end portion 54 that is coupled to the power turbine 44 by way of a coupling 46.

The power turbine shaft 48 includes an axial length 50 that is equal to or greater than ½ an axial distance 58 between a leading edge 42 of the fan blades 40 and the coupling 46 to the power turbine 44. The power turbine shaft 48 extends the axial length 50 between a first bearing assembly 146 and a second bearing assembly 144. The first bearing assembly 142 is supported by a first support structure 146 and the second bearing assembly 144 is supported by a second support structure 150. The support structures 146, 150 are shown schematically and may be configured as portions of other static engine or nacelle cases, supports or structures. The bearing assemblies 142, 144 are provided with a lubricant flow 152 from a schematically shown engine lubrication system 154. The bearing assemblies 142, 144 may be configures as ball, roller, tapered or any combination of bearing structures compatible with the engine environment and shaft speeds.

Referring to FIG. 2 with continued reference to FIG. 1, another example propulsion system 25 is shown schematically and includes an inclined gas generating core engine 66. The core engine 66 is disposed along a core engine axis 68 that is inclined at an angle 70 relative to the fan axis A. The angled orientation of the core engine axis 68 provides space for additional structures and systems within the nacelle 60 utilized for alternate propulsion system architectures. It should be understood that other engine architectures and core orientations could be utilized and are within the contemplation of this disclosure.

Engine shafts utilized within the core engine are formed from metal alloys and compositions capable of withstanding extreme temperatures and loads encountered during turbine engine operation. Shafts within the core engine 22 are typically nested within each other and are subject to space and assembly limitations and constraints. For example, some shafts are nested within other shafts and therefore must be smaller and have substantially uniform diameters. The space constraint due to such a configuration places limits on all aspects of a core engine shaft including material selection, length, diameter, shape, and configuration of supportive bearing structures.

The example power turbine shaft 48 is not disposed within the core engine 22 and therefore is free from constraints of turbine shafts utilized within a core engine. The example power turbine shaft 48 may be formed from metal alloys, light weight steel alloys or alternate composite materials. Alternate composite materials may include carbon fiber reinforced plastic or other advance composite materials. The example power turbine shaft 48 has a larger outer diameter than would be practical for shafts utilized within the core engine 22. Moreover, the overall shape of power turbine shaft 48 including the larger center portion 56 is enabled by the disclosed engine architecture that includes the remote core engine 22 location.

Referring to FIG. 3 with continued reference to FIGS. 1 and 2, the center portion 56 and end portions 52, 54 are shown schematically. The end portions 52, 54 are shown with the corresponding bearing assembly 142, 144. Each of the first and second bearing assemblies 142, 144 have a corresponding inner diameter 148, 156. In one disclosed example embodiment, the inner diameters 142, 144 corresponding to respective ones of the first bearing assembly 142 and the second bearing assembly 144 may be different. In one disclosed embodiment, both the first and second bearing assemblies 142, 144 have equal inner diameters 148, 156 within accepted standard tolerances. In one disclosed example embodiment, the inner diameters 148, 156 are between about 3.5 inches and 8.0 inches (88.9 mm and 203.2 mm). In another disclosed example embodiment, the inner diameters 148, 156 are between about 5.0 inches and 6.0 inches (127 mm and 152.4 mm).

The inner diameters 148, 156 are diameters that correspond with the interface of each of the bearing assemblies 142, 144. The end portions 52 and 54 may have different diameters and configurations before and after the bearing configurations that correspond with coupling and attachment features such as splines interfaces. Accordingly, the inner diameters 148, 156 are reflective of diameters that correspond with an interface with the bearing assemblies 142, 144 within each of the end portions 52, 54 of the power turbine shaft 48.

The center portion 56 includes a center outer diameter 74 that is greater than either a first end outer diameter 76 or a second end outer diameter 72. The larger outer diameter 74 increases stiffness of the power turbine shaft 48 and provides for operation and increased speeds.

Increased operational shaft speeds are supported by the bearing assemblies 142, 144. The inner diameters 148, 156 of the bearing assemblies 142, 144 and the larger outer diameter 74 of the center portion 56 are structured to complement each other to enable the increased shaft speeds. In one example embodiment, the relationship between the outer diameter 74 in the center portion 56 is related to a maximum inner diameter to a maximum inner diameter of each bearing assembly In one example embodiment, the outer diameter 74 and a maximum bearing inner diameter 148, 156 of each of the bearing assemblies 148, 156 is related according to a defined ratio. The defined ratio accounts for the shaft speed, requires stiffness provided by the outer diameter 74 of the center portion and capabilities of the bearing assemblies 142, 144. Moreover, as the specific size of the outer diameter 74 and the inner diameters 148, 156 may be scaled depending on application specific parameters, it is appropriate to describe the relative diameters of the power turbine shaft 48 as a ratio.

In one disclosed example embodiment, a ratio of the outer diameter 74 to either of the inner diameters 148, 156 of the bearing assemblies 142, 144 is between about 1.25 and 5.00. In another example embodiment, the ratio of the outer diameter 74 to the inner diameter 148, 156 is between about 1.5 and 2.5.

Referring to FIGS. 4, 5 and 6, the power turbine shaft 48 is a one-piece hollow part with a center portion 56 disposed between the first end portion 52 and the second end portion 54. The center portion 56 includes the center outer diameter 74 that is greater than either the first end outer diameter 76 or the second end outer diameter 72. An outer diameter 78 increases in a direction away from the corresponding end portion 52, 54 toward the center portion 56. Accordingly, the power turbine shaft 48 includes a bulged, larger center outer diameter 74 at the center portion 56. In one example embodiment, the center outer diameter 76 is the maximum outer diameter and is greater than any outer diameter of the at least one shaft 35 of the core engine 22.

The larger center outer diameter 74 provides an increase in overall shaft stiffness that improves rotor dynamic stability. In one disclosed example, the center outer diameter 74 is uniform for an axial length 88. The axial length 88 is centered on a center point 90 of a total longitudinal length 95 of the power turbine shaft 48. In one example embodiment, the center point 90 is spaced an axial distance 92 from each end portion 52, 54.

The outer diameter 78 expands uniformly over the axial distance 94 from either of the end portion 52, 54 to the center portion 56. The increased outer diameter at the center portion 56 provides increased stiffness that improves rotor dynamic response and provides a favorable higher natural frequency as compared to shafts with a single uniform outer diameter over the entire shaft length. In one example embodiment, the power turbine shaft 48 includes a 1st mode natural frequency that is at least 15% greater than a similar shaft with a uniform outer diameter.

A wall 80 of the power turbine shaft 48 changes thickness between the end portions 52, 54 and the center portion 56. In one example embodiment, the wall 80 decreases in thickness in a direction away from the end portions 52, 54 toward the center portion 56. The example end portions 52, 54 have a wall thickness 84 that is less than a wall thickness 82 within the center portion 56. In one disclosed example, the thickness 84 decreases uniformly along the axial length 94 toward the center portion 56. In the axial length 88, the wall thickness 82 remains constant.

Each of the end portions 52, 54 may include splines 86 for coupling to the power turbine 44 and the fan drive gear system 36. The splined portions 86 may be of a different wall thickness than the wall thickness 84 to accommodate the spline features.

Figure 7:
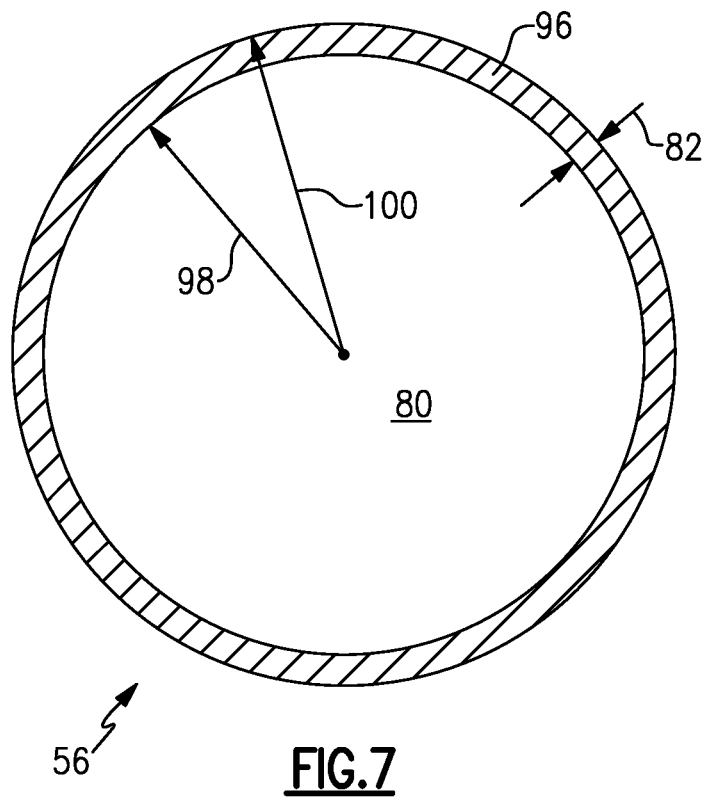
FIG. 7 is a cross-section of the center portion transverse to a longitudinal length of the example power turbine shaft.
Figure 8:
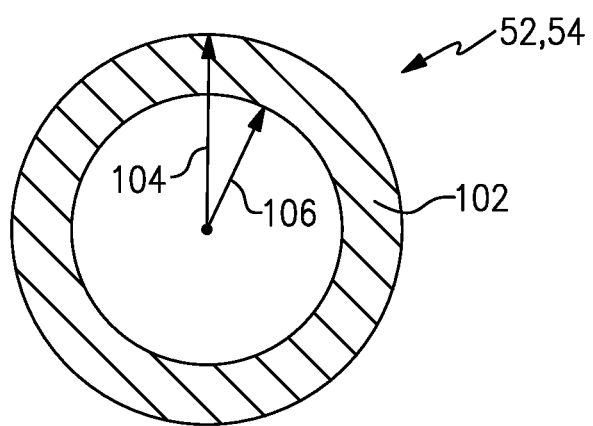
FIG. 8 is a cross-section of the end portion transverse to the longitudinal length of the example power turbine shaft.

Referring to FIGS. 7 and 8 with continued reference to FIGS. 4, 5 and 6, a radial cross-section transverse to the axis A is shown through the center portion 56 (FIG. 6) and through the end portions 52, 54 (FIG. 7). The decreasing wall thickness provides a uniform material area over the changes in outer diameter. As the outer diameter increases, the wall thickness decreases to maintain a uniform material area across the length of the power turbine shaft 48.

In one example embodiment, a ratio of a maximum radial wall thickness at the end portions 52, 54 to a minimum radial wall thickness at the center portion 56 of the power turbine shaft is between 1.1 and 3.0. In another disclosed example embodiment, the ratio of the maximum radial wall radial thickness at the end portions 52, 54 to the minimum radial wall thickness at the center portion of the power turbine shaft 48 is between 1.1 and 2.0. In another disclosed example embodiment, the ratio of the maximum radial wall radial thickness at the end portions 52, 54 to the minimum radial wall thickness at the center portion 56 of the power turbine shaft 48 is between 1.1 and 1.5.

The thickness at the splines 86 does not correspond with the uniform area as the ends are adapted to provide the coupling to the power turbine 44 and the gear system 36.

The material area is the area of an annulus between an outer radius and an inner radius. The example shaft 48 is shown and disclosed as a perfect circle and therefore the area is determined utilizing the formula $\pi \times (RO^2 - RI^2)$, where RO is the outer radius and RI is the inner radius. Accordingly, in one example embodiment, the area 96 of the center portion 56 is determined utilizing the outer radius 100 and inner radius 98. The area 102 in each of the end portions 52, 54 is determined using the outer radius 104 and the inner radius 106. The area 96 and the area 102 are equal along the axial length of the shaft 48 to provide for a common a uniform shear area. Accordingly, the material area determined in any two places along the shaft 48, except for the splined portions, are equal in the disclosed example power turbine shaft 48.

Referring to FIG. 9, another example power turbine shaft 108 is schematically shown with an offset midway portion 110 disposed between first and second end portions 112, 114. In this example shaft 108, the midway portion 110 includes an outer diameter 116 that is greater than an outer diameter 118 at either of the end portions 112, 114. A shaft wall 132 varies in thickness to maintain a common material area along the length of the shaft 108.

In this example, the midway portion 110 is spaced unequal distances from the first and second end portions 112, 114. The midway portion 110 is spaced a first axial distance 122 from the first end portion 112 and a second axial distance 126 from the second end portion 114. The second axial distance 126 is greater than the first axial distance 122 in this example embodiment. In one disclosed example embodiment, the midway portion 110 is disposed at a location between 50% and 75% of a total length 140 of the power turbine shaft 108.

Although the first and second axial distances 122, 126 are not equal, the material area of the shaft wall 132 remains constant. The shaft wall 132 will decrease in thickness in proportion to an increase in the outer diameter. Accordingly, a thickness 134 decreases in a direction away from the second end portion 114 for the axial length 126. The thickness 136 is disposed within the axial distance 122 between the first end 112 and the midway portion 110.

The thickness 136 decreases in a direction toward the midway portion 110. The midway portion 110 includes a thickness 138 that is uniform along the axial length 130 of the midway portion 110. The outer diameter 116 along with the wall thickness 138 in the midway portion 110 is constant within the axial length 130. Outside of the midway portion 110, the first wall thickness 134 and the second wall thickness 136 increase in a direction toward the corresponding one of the end portions 112, 114.

Although both the first end portion 112 and the second end portion 114 are disclosed as having the same outer diameter 118, different outer diameters could be utilized at each end portion an remain within the contemplation and scope of this disclosure. An embodiment with different outer diameters at each of the end portions 112, 114 would also have different wall thicknesses to maintain equal material area along the length of the shaft 108.

In this example, the midway portion 110 is offset closer to the first end 112 than to the second end 114. The midway portion 110 is centered about the point 128 that is spaced an axial distance 120 from the first end portion 112 and a distance 124 from the second end portion 114. The offset location of the midway portion 110 provides for tailoring the shaft to application specific requirements. The midway portion 110 may be located at different locations along the length of the shaft 108 and be closer to the second end portion 114 then to the first end portion 112.

Although the example power turbine shafts 48, 108 are shown and described by way of example, other configurations of shafts and diameters that maintain a uniform material area along the length are also possible within the scope and contemplation of this disclosure.

Accordingly, the example disclosed propulsion system embodiments include a long power turbine shaft that enables increased axial distances between a power turbine and the fan section while maintaining rotor dynamic stability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a propulsor section including a fan with a plurality of fan blades rotatable about a fan axis;
a core engine configured to generate a gas flow;
a power turbine mechanically uncoupled from the core engine and rotatable independent of the core engine where the gas flow from the core engine is expanded to generate shaft power; and
a power turbine shaft disposed outside of the core engine and coupled between the power turbine and the propulsor section, wherein the power turbine shaft is of an axial length between a first end portion and a second end portion along the fan axis that is greater than half a distance between a leading edge of the fan blades and a mechanical coupling of the power turbine shaft to the power turbine, and includes an outer diameter that increases in a direction away from each of the first end portion and the second end portion, and wherein the power turbine shaft includes a radial wall with a thickness that varies between the first end portion and the second end portion such that a cross-sectional area of the radial wall transverse to a longitudinal length of the power turbine shaft is uniform between the first end portion and the second end portion.

2. The propulsion system as recited in claim 1, wherein the core engine is centered on a core axis that is inclined relative to the fan axis.

3. The propulsion system as recited in claim 1, wherein the propulsor section is forward of the power turbine and the core engine is disposed aft of the power turbine.

4. The propulsion system as recited in claim 1, wherein the power turbine shaft is unsupported between the first end portion and the second end portion.

5. The propulsion system as recited in claim 1, wherein the propulsor section includes a fan drive gear system coupled to the power turbine shaft.

6. The propulsion system as recited in claim 1, wherein a ratio of a maximum radial wall thickness and a minimum radial wall thickness of the power turbine shaft is between 1.1 and 3.0.

7. The propulsion system as recited in claim 1, wherein a center portion of the power turbine shaft disposed between the first end portion and the second end portion includes a maximum outer diameter and a minimum wall thickness.

8. The propulsion system as recited in claim 7, wherein a ratio of an outer diameter at the center portion to an inner diameter of a bearing assembly at either of the first end portion and the second end portion is between 1.25 and 5.00.

9. The propulsion system as recited in claim 7, wherein the center portion is disposed an equal distance from each of the first end portion and the second end portion.

10. The propulsion system as recited in claim 7, wherein the center portion is disposed at a location between 50% and 75% of a total length of the power turbine shaft.

11. The propulsion system as recited in claim 7, wherein the center portion includes a constant outer diameter over a center axial distance.

12. The propulsion system as recited in claim 1, further comprising a nacelle surrounding the core engine and the fan section, the nacelle defining a bypass flow path through the nacelle and around the power turbine and the core engine.

13. A propulsion system for an aircraft comprising:
a fan section including a fan drive gear system driving a fan shaft supporting a plurality of fan blades about a fan axis;
a core engine defining a core flow path where air is compressed in a compressor section, communicated to a combustor section, mixed with fuel, and ignited to generate a gas flow that is expanded through a turbine section;
a power turbine mechanically uncoupled from the core engine and rotatable independent of the core engine where the gas flow from the core engine is expanded to generate shaft power; and
a power turbine shaft disposed outside of any portion of the core engine for transmitting torque from the power turbine to the fan drive gear system, wherein the power turbine shaft is hollow and includes an outer diameter that increases in a direction away from each of a first end portion and a second end portion and is of an axial length between the first end portion and the second end portion along the fan axis that is greater than half a distance between a leading edge of the plurality of fan blades and a mechanical coupling to the power turbine, and wherein the power turbine shaft includes a radial wall thickness that varies between the first end portion and the second end portion such that a cross-sectional area of the radial wall transverse to a longitudinal length of the power turbine shaft is uniform between the first end portion and the second end portion.

14. The propulsion system as recited in claim 13, wherein the power turbine shaft is unsupported between the first end portion and the second end portion.

15. The propulsion system as recited in claim 14, wherein a center portion of the power turbine shaft disposed between the first end portion and the second end portion includes a maximum outer diameter and a minimum wall thickness.

16. The propulsion system as recited in claim 15, wherein the core engine includes at least one shaft coupling the turbine section to the compressor section and the maximum diameter of the power turbine shaft is greater than any outer diameter of the at least one shaft of the core engine.

17. A method of operating a gas turbine engine, the method comprising:
generating a gas flow with a core engine that is disposed about a core engine axis that is inclined relative to a fan axis;
generating shaft power to drive the fan having a plurality of fan blades with a power turbine receiving the gas flow from the core engine; and
transmitting shaft power to a fan disposed about the fan axis through a power turbine shaft with an axial length along the fan axis that is greater than half a distance between a leading edge of the plurality of fan blades and a mechanical coupling to the power turbine, and that includes a radial wall thickness that varies between a first end portion and a second end portion such that a cross-sectional area of the radial wall transverse to a longitudinal length of the power turbine shaft is uniform between the first end portion and the second end portion.

18. The method as recited in claim 17, wherein the power turbine shaft includes an outer diameter that increases in a direction away from each of a first end portion and a second end portion and has a 1st mode natural frequency that is at least 15% greater than a similar shaft with a uniform outer diameter.

* * * * *